United States Patent
Snider

(10) Patent No.: US 6,394,619 B1
(45) Date of Patent: May 28, 2002

(54) APPLIQUE WITH INTEGRATED LIGHT FILTERS

(75) Inventor: Chris Ralph Snider, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/685,104

(22) Filed: Oct. 11, 2000

(51) Int. Cl.[7] .............................................. G01D 11/28
(52) U.S. Cl. .............................. 362/30; 362/23; 362/29; 200/313
(58) Field of Search ............................... 362/23, 26, 28, 362/29, 30, 482, 489, 293, 583, 85; 200/313, 310, 311, 317, 314

(56) References Cited

U.S. PATENT DOCUMENTS

| | | | | |
|---|---|---|---|---|
| 2,699,141 A | * | 1/1955 | Gaguski | 116/332 |
| 2,831,453 A | * | 4/1958 | Hardesty | 116/288 |
| 4,991,064 A | * | 2/1991 | Clem | 362/27 |
| 5,512,226 A | * | 4/1996 | Rosica | 264/132 |
| 5,696,483 A | * | 12/1997 | Khalid | 340/456 |
| 5,697,689 A | * | 12/1997 | Levine | 362/26 |
| 5,736,233 A | * | 4/1998 | Fye | 428/204 |

* cited by examiner

Primary Examiner—Sandra O'Shea
Assistant Examiner—Hargobind S. Sawhney
(74) Attorney, Agent, or Firm—Jimmy L. Funke

(57) ABSTRACT

An illuminated switch member assembly is disclosed. The assembly includes an applique coupled to a faceplate and substantially parallel to a circuit board such that a first light channel is defined. The assembly also includes a switch member casing coupled to the faceplate such that a second light channel is defined by the walls of the casing. And, an actuator is connected to the circuit board through a contact mechanism and to the button member casing. The assembly further includes a light filter attached to the applique and disposed between the faceplate and the circuit board such that the light filter substantially divides the first light channel from the second light channel. Furthermore, a light source is disposed within the first light channel and emanates a light. Upon activation of the assembly, the light emanates from the light source and through the first light channel and the light filter. The light subsequently reflects off a surface on the actuator such that it travels through the second light channel to illuminate the switch member.

16 Claims, 2 Drawing Sheets

APPLIQUE WITH INTEGRATED LIGHT FILTERS

TECHNICAL FIELD

The present invention relates generally to electrical switches, and, more particularly, to illumination for switch members such as buttons.

BACKGROUND ART

It is well known in the automotive field that backlit control panels often use switch members with some form of illumination for nighttime visibility.

Often, the coloration of switch members is provided by a light filter media either connected to the light source or attached at the opening in the switch member. Also, switch members have been both molded in translucent, colored, plastic resin or simply coated in the desired color. However, it is cumbersome to manufacture and assemble light source covers or to paint or apply resin directly to the switch member opening. Also, colored plastic resins for the switch member is an added cost to manufacturing.

The disadvantages associated with these conventional switch member illumination techniques have made it apparent that a new technique for illuminating switch members is needed. The new technique should facilitate assembly of control panels and should not require colored plastic resins for the switch members. The present invention is directed to these ends.

SUMMARY OF THE INVENTION

It is, therefore, an object of the invention to provide an improved, reliable and less expensive assembly for illuminating switch members.

In one aspect of the invention, an illuminated switch member assembly is disclosed. The assembly includes an applique coupled to a faceplate and substantially parallel to a circuit board such that a first light channel is defined. The assembly also includes a switch member casing coupled to the faceplate such that a second light channel is defined by the walls of the casing. And, an actuator is connected to the circuit board through a contact mechanism and to the button member casing. The assembly further includes a light filter attached to the applique and disposed between the faceplate and the circuit board such that the light filter substantially divides the first light channel from the second light channel. Furthermore, a light source is disposed within the first light channel and emanates a light. Upon activation of the assembly, the light emanates from the light source and through the first light channel and the light filter. The light subsequently reflects off a surface on the actuator such that it travels through the second light channel to illuminate the switch member.

In another aspect of the invention, a process for directing light through a switch includes directing light from a light source through a circuit board and an applique coupled to a faceplate. The aforementioned elements define a first light channel. The process further includes filtering light through a light filter. After filtering the light, the light is reflected off a surface on an actuator connected to the circuit board into a casing for the switch member which defines a second light channel such that the light emanates from the switch member.

The present invention thus achieves an improved assembly for illuminating switch members. The present invention is advantageous in that it reduces part count for a control panel assembly and thus makes the assembly more reliable. Also, it simplifies the lighting of multiple colored switch members on the same control panel because the different colors are screened on the backlighting filters with the applique. Therefore, separate colored components mounted on the light source or the switch members themselves are unnecessary.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a more complete understanding of the invention, there will now be described some embodiments thereof, given by way of example, reference being made to the accompanying drawings, in which.

DETAILED DESCRIPTION

The present invention is illustrated with respect to an assembly 10 for illuminating switch members 12, particularly suited for the automotive field. However, the present invention is applicable to various other uses that may require illumination of switch members 12 such as, but not limited to, consumer electronics and appliances.

Figure 1:
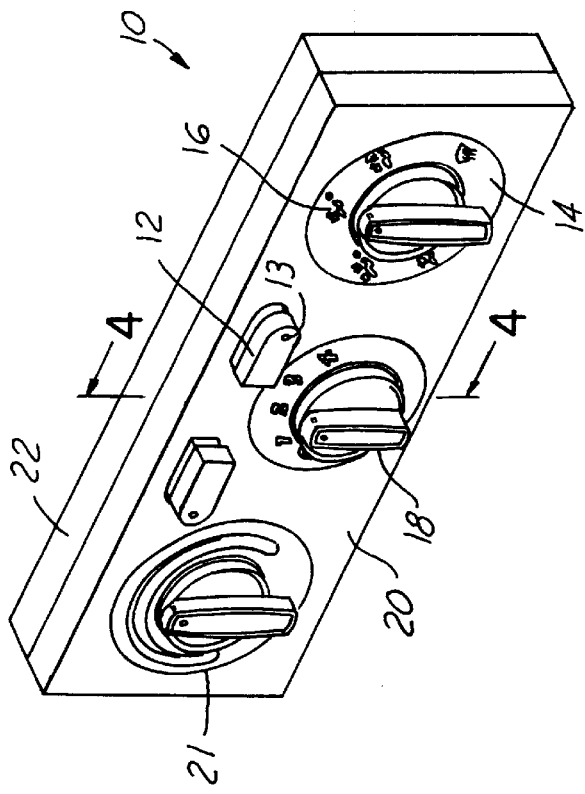
FIG. 1 is a perspective view that illustrates an assembly for illuminating switch members in accordance with one embodiment of the present invention.

Referring to FIG. 1, a perspective view of an assembly 10 for illuminating switch members 12 in accordance with one embodiment of the present invention is illustrated. The assembly 10 includes a faceplate 20 attached to a control panel case 22. This attachment will be discussed further below. The assembly 10 further includes switch members 12 which may be translucent or may alternately have openings 13 therethrough. The switch members 12 are sized to be received within openings 28 in the faceplate 20 and are secured to an internal portion of the assembly 10 discussed further below. Also, the assembly 10 includes knobs or other types of control devices 18 that select functions based on the positions thereof. The control devices 18 are sized to be received through openings 21 in the faceplate 20 and are secured to an internal portion of the assembly 10 discussed further below. Although two switch members 12 are illustrated, numerous numbers of switch members 12 may be used in the assembly 10 depending on the requirements of the assembly 10. The switch members 12 may also be embodied as buttons. The assembly 10 further includes an applique 14 which is partially shown. The applique 14 has characters 16 painted or molded therein. The function of the positions of the control devices 18 correspond to the characters 16.

Figure 2:
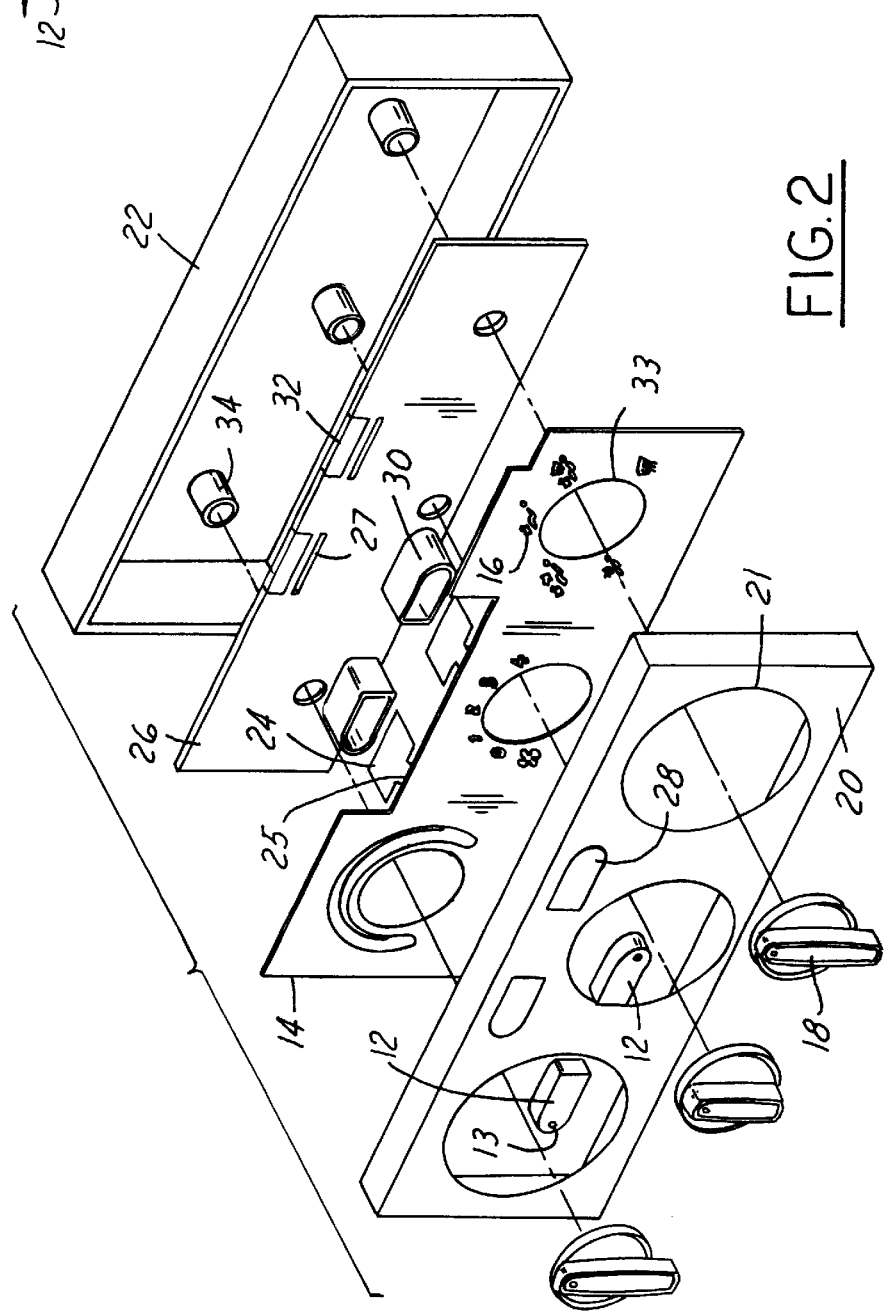
FIG. 2 is an exploded view of the assembly of FIG. 1.

Referring to FIG. 2, an exploded view of FIG. 1 is illustrated. The assembly 10 for illuminating switch members 12 further includes at least one light filter 24 which is secured to the applique 14 at a point of attachment 25 which will be further explained below. The applique 14 is positioned between the circuit board 26 and the faceplate 20 and placed against the faceplate 20 ideally without use of adhesive. The light filters 24 are inserted into a portion for coupling 27, such as a slot, in the circuit board 26 during assembly.

The switch members 12 are sized to be received within openings 28 in the faceplate 20 and attach to switch member casings 30 which are attached to the faceplate 20. Also, the contact mechanism 32 for the switch members 12 attaches the actuator 38 to the circuit board 26. The control devices 18 are attached to the assembly 10 through openings 21 in the face plate 20. These openings 21 are aligned with openings 33 in the applique 14. The control devices 18 are further attached to guiding members 34 that are incorporated in the control panel case 22. The control panel case 22 attaches to the faceplate 20 to enclose the assembly 10.

Ideally, the light filters 24 and the applique 14 are formed from the same material. The preferred material for the applique 14 and the filters 24 is a pliable poly-carbonate film. With this form of applique 14, the filter 24 may be molded from the same material as the applique 14. Also, with this form of applique, the point of attachment 25 of the applique 14 to the filters 24 will fold permanently without breaking or requiring supplemental attachment, such as an adhesive, to the applique. Furthermore, the filter 24 is ideally colored when the applique 14 is colored to minimize manufacturing costs. That is, the filters 24 are molded and are the color of the applique 14 material. To alternately embody the coloration, color is screened on the filters 24 after they are molded. Moreover, the assembly 10 facilitates multi-colored switch member 12 illuminations when different filters 24 are screened with different colors.

Figure 3:
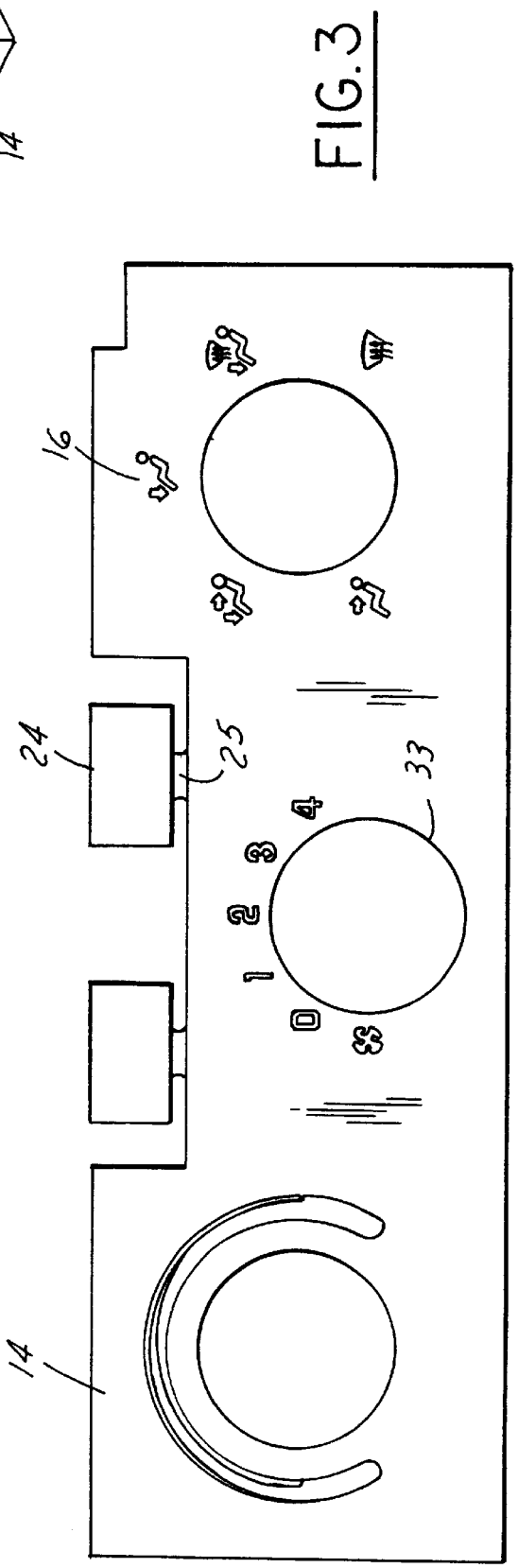
FIG. 3 is a front elevational view of the applique in FIG. 1 with backlighting filters attached in accordance with one embodiment of the present invention.

Referring to FIG. 3, a front view of the applique 14 of FIG. 1 with back-lighting filters 24 attached in accordance with one embodiment of the present invention is illustrated. This demonstrates the filters 24 in the plane of the applique 14, which is the ideal state of the applique 14 for transportation and storage prior to the insertion of the applique 14 into the rest of the assembly 10. However, in a further embodiment of the invention, the filters 24 are folded at the points of attachment 25 from the plane of the applique 14 during the molding process and prior to transportation. Also, the previously discussed openings 33 in the applique 14, through which the control devices 18 are inserted in and are attached to the system, are included in FIG. 3. In addition, the characters 16 from FIG. 1 are illustrated as an example of an arrangement on a typical applique 14.

Figure 4:
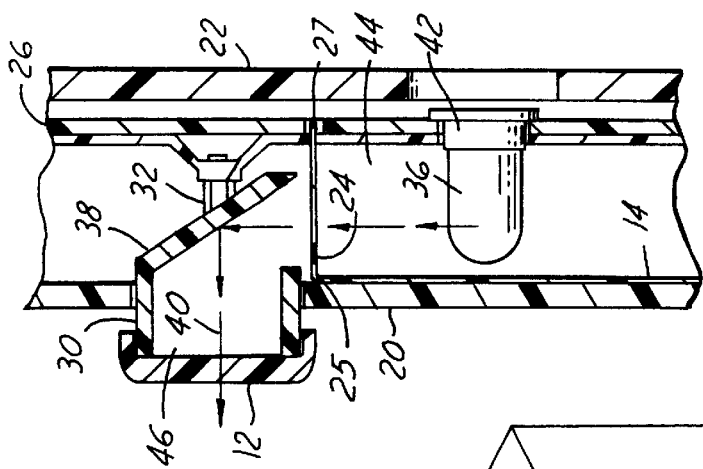
FIG. 4 is a cross-sectional view of FIG. 1 along line 4—4.

Referring to FIG. 4, a cross-sectional view of FIG. 1 along line 4—4 is illustrated. The assembly 10 further includes a light source 36 which is, for example, an incandescent lamp. Light from the light source 36 is reflected off the surface of the actuator 38 along line 40 and is visible through the switch member 12. The light source 36 is attached to the control panel case 22 by a light source mount 42 which is attached to the circuit board 26 and the control panel case 22. To add, the assembly 10 includes an applique 14 coupled to a faceplate 20 and substantially parallel to the circuit board 26 such that a first light channel 44 is defined. The assembly 10 also includes a switch member casing 30 coupled to the faceplate 20 such that a second light channel 46 is defined by the walls of the casing 30. The assembly 10 further includes a light filter 24 attached to the applique 14 and disposed between the faceplate 20 and the circuit board 26 such that the light filter 24 substantially divides the first light channel 44 from the second light channel 46. Furthermore, a light source 36 is disposed within the first light channel light 46 and emanates a light. An actuator is connected to the circuit board 26 through a contact mechanism 32. Upon activation of the assembly 10, the light emanates from the light source 36 and through the first light channel 44 and the light filter. The light subsequently reflects off the surface of the actuator 38 such that it travels through the second light channel 46 to illuminate the switch member 12.

During construction of the assembly 10, the applique 14 is inserted between the faceplate 20 and the circuit board 26. Also, a portion for coupling 27 in, for example, the circuit board 26 simplifies the securing of the applique 14 to the assembly 10 because the filters 24 are sized to be received within the portion for coupling 27. The portion for coupling 27 is illustrated as a pair of slots in the circuit board 26. However, another embodiment of the assembly 10 is where, for example, the portion for coupling 27 is a ledge that the light filters 24 are attached to.

In operation, the switch members 12 are activated. Then, light from the light source 36 travels along line 40 through the first light channel 44 and through the filter 24, which is a barrier between the first 44 and second 46 light channels. Then, the light emanates through the second light channel 46 and is reflected off the surface of the actuator 38 which in turn illuminates the switch member 12. The assembly 10 is alternatively embodied with a supplementally filtered light source 36 and supplementally filtered switch members 12. That is, the light source 36 covered in a colored resin or the switch member 12 with an opening 13 that contains a colored resin are examples of supplemental filtration. A further alternative embodiment of the assembly 10 is with the light source 36 positioned to provide direct light to the filter 24 in an alternate assembly lacking an actuator 38.

From the foregoing, it can be seen that there has been brought to the art a new and improved assembly 10 for illuminating switch members 12. It is to be understood that the preceding description of the preferred embodiment is merely illustrative of some of the many specific embodiments that represent applications of the principles of the present invention. Numerous and other arrangements would be evident to those skilled in the art without departing from the scope of the invention as defined by the following claims.

What is claimed is:

1. An illuminated switch member assembly comprising:

an applique;

a faceplate coupled to said applique;

a circuit board substantially parallel to said applique such that a first light channel is defined;

an actuator with a surface for reflecting light, said actuator coupled to a switch member casing and connected to said circuit board through a contact mechanism;

said switch member casing moveably coupled to said faceplate such that a second light channel is defined by walls of said casing;

a first light filter having a first color coupled to said applique and disposed between said applique and said circuit board;

a light source disposed within said first light channel and emanating a light; and a colored enclosure covering said light source, whereby said light source is supplementally filtered by said colored enclosure;

whereby said light from said light source travels through said first light channel and said first light filter and is reflected from said surface on said actuator into said second light channel to illuminate a switch member.

2. The assembly for lighting switch members as recited in claim 1 further comprising a colored resin applied to said switch member, whereby said switch member is supplementally filtered by said colored resin.

3. The assembly for lighting switch members as recited in claim 1, wherein said applique comprises a second light filter having a second color substantially different from said first color.

4. The assembly for lighting switch members as recited in claim 1, wherein said applique and said first light filter comprise a pliable poly-carbonate film.

5. An illuminated switch member assembly comprising:
   an applique;
   a faceplate coupled to said applique;
   a circuit board substantially parallel to said applique such that a first light channel is defined;
   an actuator with a surface for reflecting light, said actuator coupled to a switch member casing and connected to said circuit board through a contact mechanism;
   said switch member casing moveably coupled to said faceplate such that a second light channel is defined by walls of said casing;
   a first light filter having a first color coupled to said applique and disposed between said applique and said circuit board wherein said first light filter substantially divides said first light channel from said second light channel; and
   a light source disposed within said first light channel and emanating a light;
   whereby said light from said light source travels through said first light channel and said first light filter and is reflected from said surface on said actuator into said second light channel to illuminate a switch member.

6. An illuminated switch member assembly comprising:
   an applique;
   a faceplate coupled to said applique;
   a circuit board substantially parallel to said applique such that a first light channel is defined;
   an actuator with a surface for reflecting light, said actuator coupled to a switch member casing and connected to said circuit board through a contact mechanism,
   said switch member casing moveably coupled to said faceplate such that a second light channel is defined by walls of said casing;
   a first light filter having a first color coupled to said applique and disposed between said applique and said circuit board wherein said first light filter is coupled to said circuit board; and
   a light source disposed within said first light channel and emanating a light;
   whereby said light from said light source travels through said first light channel and said first light filter and is reflected from said surface on said actuator into said second light channel to illuminate a switch member.

7. A method of assembling a control panel case comprising:
   coupling an applique to a faceplate so that said applique is substantially parallel to a circuit board such that a first light channel is defined therebetween;
   slidably coupling a switch member casing to said faceplate such that a second light channel is defined therein by walls of said casing;
   positioning a first light filter having a first color between a light source and the switch member so that said first light filter extends substantially across said first light channel.

8. The method of assembling as recited in claim 7, wherein positioning includes coupling said first light filter to said circuit board.

9. The method of assembling as recited in claim 7, wherein positioning includes molding an applique to said first light filter at a flexible point of contact.

10. The method of assembling as recited in claim 7, wherein positioning includes folding said first light filter from a plane of said applique.

11. The method of assembling as recited in claim 7, wherein positioning includes leveling said first light filter in relation to said applique.

12. The method of assembling as recited in claim 7, wherein said positioning step includes the step of positioning a second light filter having a second color substantially different from said first color.

13. A method for illuminating a switch member comprising:
   directing light from a light source through a first light channel defined between a circuit board and an applique coupled to a faceplate;
   filtering said light trough a light filter to produce filtered light;
   supplementally filtering said light source through a colored enclosure covering said light source; and
   reflecting said filtered light from a surface on an actuator into a second light channel within the switch member such that said filtered light emanates from the switch member.

14. The method for illuminating as recited in claim 13, wherein directing said light through a second light channel includes defining said second light channel within walls of a casing for the switch member.

15. A method for illuminating a switch member comprising:
   directing light from a light source through a first light channel defined between a circuit board and an applique coupled to a faceplate;
   filtering said light through a light filter to produce filtered light;
   supplementally filtering the switch member through a colored resin on the switch member; and
   reflecting said filtered light from a surface on an actuator into a second light channel within the switch member such that said filtered light emanates from the switch member.

16. A method for illuminating as recited in claim 15, wherein directing said light through a second light channel includes defining said second light channel within walls of a casing for the switch member.

* * * * *